United States Patent [19]

Burgess et al.

[11] Patent Number: 5,572,073
[45] Date of Patent: Nov. 5, 1996

[54] AC POWER MODULE FOR AUTOMATION SYSTEM

[75] Inventors: Michael H. Burgess; James D. Pritchett; Douglas L. Voita, all of Naples, Fla.

[73] Assignee: IntelliNet, Inc., Naples, Fla.

[21] Appl. No.: 196,472

[22] Filed: Feb. 15, 1994

[51] Int. Cl.$^6$ .................................................. H02J 3/14
[52] U.S. Cl. .............................. 307/38; 307/31; 307/34; 307/39
[58] Field of Search ............................. 307/31, 34, 38, 307/39; 361/160, 166, 139; 335/2, 7, 16

[56] References Cited

U.S. PATENT DOCUMENTS

| | | | |
|---|---|---|---|
| 4,020,358 | 4/1977 | Wyland | 307/39 |
| 4,121,284 | 10/1978 | Hyatt | 340/72.5 |
| 4,353,502 | 10/1982 | Myers | 236/47 |
| 4,644,104 | 2/1987 | Middlemiss | 379/103 |
| 4,665,544 | 5/1987 | Honda et al. | 379/104 |
| 4,695,738 | 9/1987 | Wilmot | 307/31 |
| 4,845,773 | 7/1989 | Attallah | 379/102 |
| 4,899,217 | 2/1990 | MacFadyen et al. | 379/102 |
| 4,918,445 | 4/1990 | Bower | 341/26 |
| 4,959,713 | 9/1990 | Morotomi et al. | 358/108 |
| 5,051,720 | 9/1991 | Kittirutsunetorn | 340/310 |
| 5,059,974 | 10/1991 | Wu | 341/25 |
| 5,070,330 | 12/1991 | Wu | 341/26 |
| 5,086,385 | 2/1992 | Launey et al. | 364/188 |
| 5,119,412 | 6/1992 | Attallah | 379/102 |
| 5,256,905 | 10/1993 | Striek et al. | 307/34 |
| 5,384,490 | 1/1995 | Swartz | 307/38 |

FOREIGN PATENT DOCUMENTS

| | | |
|---|---|---|
| 00488178 | 6/1992 | European Pat. Off. . |
| 0262997 | 10/1988 | Japan . |
| 0013853 | 1/1989 | Japan . |

OTHER PUBLICATIONS

"Samantha's Features will Excite You" Popular Science, Dec. 1991, p. 49.
"Home Automation on the Verge?" The Institute, August 1987, by J. Voelcker.
"The Integrated Autograted Educated House", Popular Science, June 1990, by V. Elaine Gilmore.
"Remote Control of Heating Systems in Weekend Cottages", Tele 2, 1971 by Hans Lardner.
"Homefone" advertisement, March 25, 1983.
"Entry-Level Smart Home," Popular Science, June 1992.

Primary Examiner—William M. Shoop, Jr.
Assistant Examiner—Albert Paladini
Attorney, Agent, or Firm—Marks & Murase L.L.P.

[57] ABSTRACT

Disclosed is an AC power module for controlling the level of power to multiple electrical devices such as lights and household appliances according to control signals supplied from a processor unit. The apparatus utilizes low voltage control signals which are synchronous with the standard AC power supply to control several solid state relay which in turn regulate the AC power supplied to the devices. Each relay is optically isolated from the module. The module incorporates additional terminals through which back-up switching or control of additional relays (with different power ratings) may be provided.

The module may be constructed on a single printed circuit board (PCB) to facilitate installation and removal. According to this embodiment, the PCB has pins which matably attach to a corresponding number of L-shaped tabs provided on a standard electrical box.

9 Claims, 12 Drawing Sheets

AC POWER MODULE FOR AUTOMATION SYSTEM

CROSS REFERENCE TO RELATED APPLICATIONS

Reference is made to the following co-pending application, the disclosure of which is hereby incorporated: "HOME AUTOMATION SYSTEM" filed concurrently herewith.

FIELD OF THE INVENTION

This invention relates to an apparatus for controlling the level of power supplied to a plurality of electrical devices according to control signals supplied from a processor unit.

BACKGROUND OF THE INVENTION

Automation systems may be used to automatically control a variety of activities, such as turning lights and appliances on and off. Typically, the electrical devices controlled by the system are driven by standard alternating current power lines. Individual relays are coupled in series with each of the devices in order to control the power supplied to several different loads. Each of the relays may be operated under control of a device, such as a host computer which controls each channel of the system. These signals are used to control the relay in order to set the level of power supplied to each load.

Several difficulties are encountered in constructing such a system. For example, typically three wires are required to transmit the necessary control signals for each channel, i.e. for each device to be controlled. The large number of control lines resulting from use of many different channels increases the complexity in installation and the risk that one of the control lines may be interrupted, thereby preventing automated operation of a load. Furthermore, the control signals must be carefully generated in order to operate properly. For example, lights may flicker if the control voltage is not synchronous with the power supply.

Another difficulty is maintaining flexibility in the system. While a system may be designed which is well suited to a particular environment, it may be troublesome to adapt the system to another environment. For example, one environment may require control of only lights, radios or other light loads, while another may require control of light and heavy loads, such as water heaters or the like.

Convenience in servicing the system is still another practical consideration. Even the best-designed systems may occasionally fail. Thus, there is a need to ensure that the elements which have failed may be quickly located and easily replaced. Further, it is desirable to provide a means for operating the devices normally controlled by the system at times when the system is down.

Therefore, there is a need to provide a means which reliably controls the power supplied to a wide variety of devices according to signals supplied from a processor device. There is a further need to furnish a power control system which is convenient to use and adaptable to different environments. Finally, there is a need for a power control system which is easily installed and serviced, and which permits back-up control if the system fails.

SUMMARY OF THE INVENTION

It is an object of the invention to meet these needs, and others, by providing an AC power module for setting the level of power supplied to a plurality of devices according to control signals from a microprocessor. The AC power module comprises at least one solid state relay coupling one of the plurality of devices to a high voltage AC power supply, means for providing a low voltage reference signal having a phase synchronized with the high voltage AC power supply, means for adjusting the low voltage signal in accordance with the control signals to provide a relay signal for controlling the solid state relay device, the relay signal determining the level of power supplied to one of the plurality of device, and means for monitoring power supplied to the one of the plurality of devices which provides a digital signal to the microprocessor that indicates whether current is flowing through the one of the plurality of devices.

According to one aspect of the invention, the means for providing a low voltage reference signal is optically isolated from the at least one relay.

According to another aspect of the invention, the means for adjusting includes a counter which reads in the control signals from the microprocessor according to a clock pulse supplied by a multiplier circuit, the clock pulse having a frequency which is a multiple of the frequency of the high voltage AC power supply.

According to yet another aspect of the invention, the AC power module further comprises means for providing a second relay signal for controlling the solid state relay device, the relay signal determining the level of power supplied to the one of the plurality of devices.

According to still another aspect of the invention, the AC power module further includes means for providing the relay signal to a relay that is external to the AC power module.

According to another aspect of the invention, the AC power module is constructed on a printed circuit board (PCB) which is detachably mounted in an electrical box, the PCB having a plurality of pins which are matably connectable to a corresponding plurality of L-shaped tabs attached to the electrical box.

DETAILED DESCRIPTION OF THE PREFERRED EMBODIMENT

Figure 1:
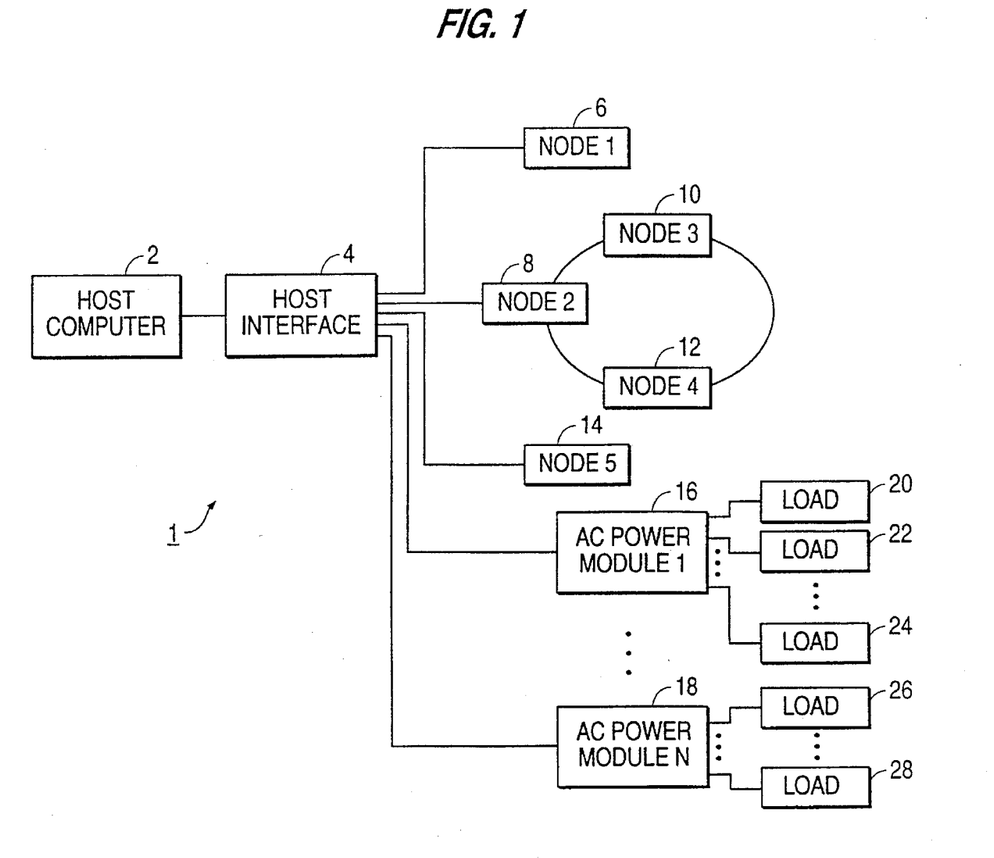
FIG. 1 is a block diagram showing an automated system according to the present invention.

FIG. 1 is a block diagram which illustrates an automated system 1 according to the present invention. As shown, a host computer 2 is coupled to several different nodes 6, 8, 10, 12, and 14 via a host interface 4. Each node may control different functions as instructed by the host computer 2. The nodes may include a plurality of AC power modules 16 and 18 (represented by AC Power Module 1 through AC Power Module N), each of which control the power supplied to a plurality of loads 20, 22, 24, 26, and 28.

FIGS. 2 to 7B illustrate a detailed example of the AC power module referred to in reference to FIG. 1. According to the specific example discussed herein, the AC power module may be used to control up to twenty-four channels each controlling the power delivered to separate loads of up to 500 W with an overall limit of 6,000 W. In a preferred embodiment, the twenty-four channels are organized in two groups of twelve channels, each group being wired to one phase component of the standard two phase AC power supply. Alternatively, each group may be coupled to an AC supply having the same phase.

Although reference is made to such a preferred embodiment, the invention is not so limited. A fewer or a greater number of channels may be provided, or components controlling loads with higher power requirements may be added without departing from the spirit and scope of the invention.

Figure 2:
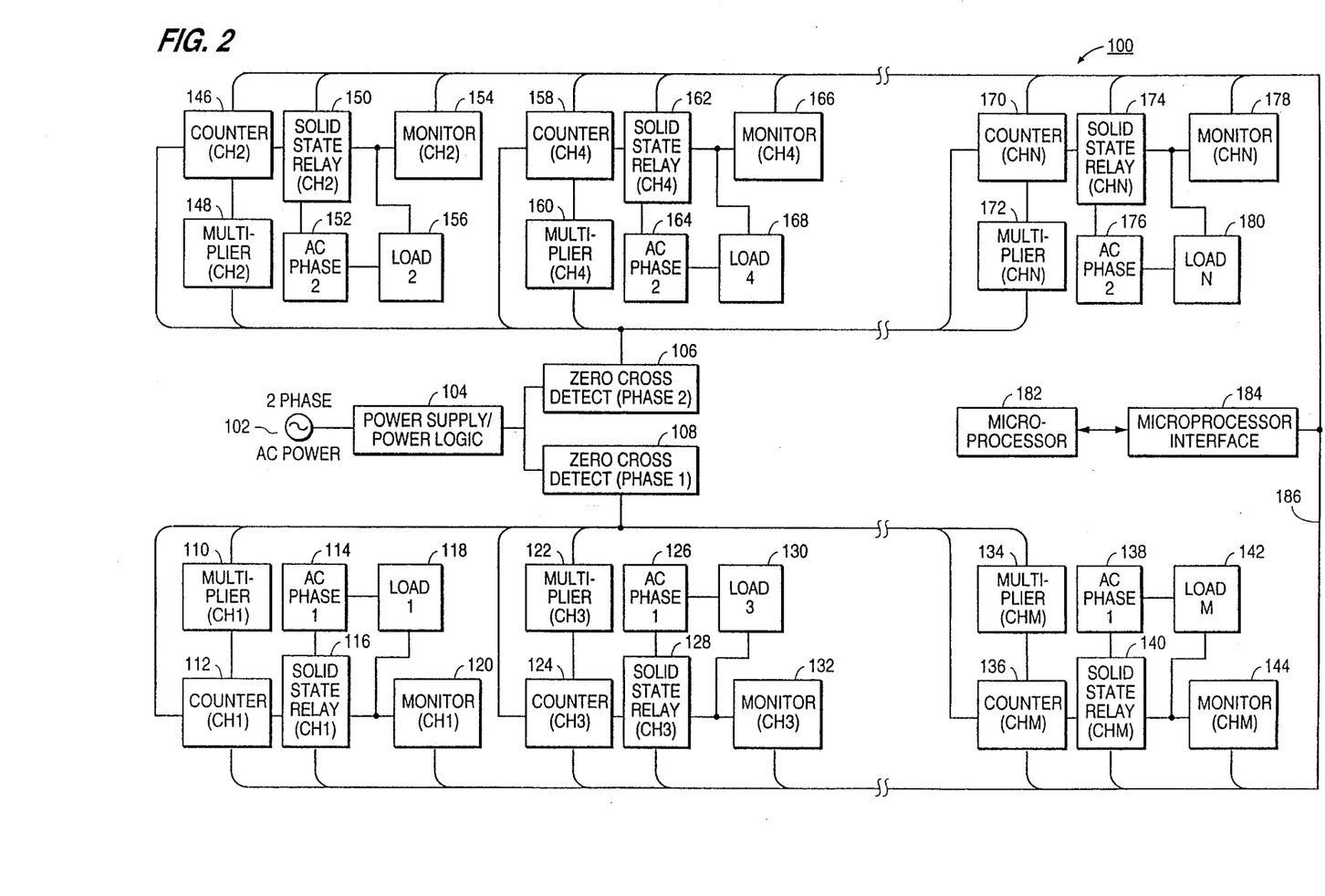
FIG. 2 is a block diagram showing an embodiment of an AC power module.

FIG. 2 is a simplified block diagram representing an AC power module 100 used to control the level of AC power supplied to N loads separated into a first group of (odd numbered) channels respectively controlling the power to the loads labelled Load 1, Load 3, ... Load M, and a second group of (even numbered) channels respectively controlling the power to the loads labelled Load 2, Load 4, ... Load N. Each load may be a standard household electrical device such as a light, an appliance or the like. As mentioned above, according to a preferred embodiment the total number of channels N is equal to twenty-four channels comprised of two groups of twelve channel. Each group uses control signals obtained from one phase component of the standard two phase power supply.

As illustrated, a standard two-phase AC power supply 102 supplies a power signal having two components with different phases to a power supply/power logic circuit 104. The power supply/power logic circuit 104 is used to obtain two low voltage control signals which are each supplied to two respective zero cross detect circuits 106 and 108. These circuits each output a signal each time the low voltage reference signal crosses a zero point. Because the low voltage reference signal is in phase with the standard 60 Hz power supply, the pulses from the zero cross detect circuits 106 and 108 are each output approximately every 8.33 mS.

The signals from the zero cross detect circuits 106 and 108 are supplied directly to counter circuits 112, 124, 136, 146, 158, and 170 which are each coupled through a data bus 186 to a microprocessor interface circuit 184. Through this arrangement, the microprocessor 182 supplies data which indicates the level of power to be supplied to each load 118, 130, 142, 156, 168, and 180. This data is read into the counters 112, 124, 136, 146, 158, and 170 according to a clock signal supplied by multiplier circuits 110, 122, 134, 148, 160, and 172. The multiplier circuits 110, 122, 134, 148, 160, and 172 output a signal which is 256 times the frequency of the low voltage reference signals supplied from the zero cross detectors 106 and 108. Thus, each signal supplied by a counter is provided in 128 steps providing a smooth input to the solid state relays 116, 128, 140, 150, 162, and 174.

A low voltage control signal is read out of each counter 112, 124, 136, 146, 158, and 170 to N solid state relays 116, 128, 140, 150, 162, and 174 which control the high voltage power supplied to each of the loads 118, 130, 142, 156, 168, and 180. In this way, the microprocessor 182 indicates a power level for each load which is then converted into a corresponding set of control signals that determine the operation of the solid state relays 116, 128, 140, 150, 162, and 174.

In order to verify that each load is operating properly, the power supply line to each load is monitored by a monitor circuit 120, 132, 144, 154, 166, 178. These circuits provide logic signals which indicate the condition of the loads, for example, whether the loads are on or off. The logic signal is supplied to the microprocessor interface 184 through the data bus 186 thereby permitting detection of a faulty solid state relay or load.

Figure 3:
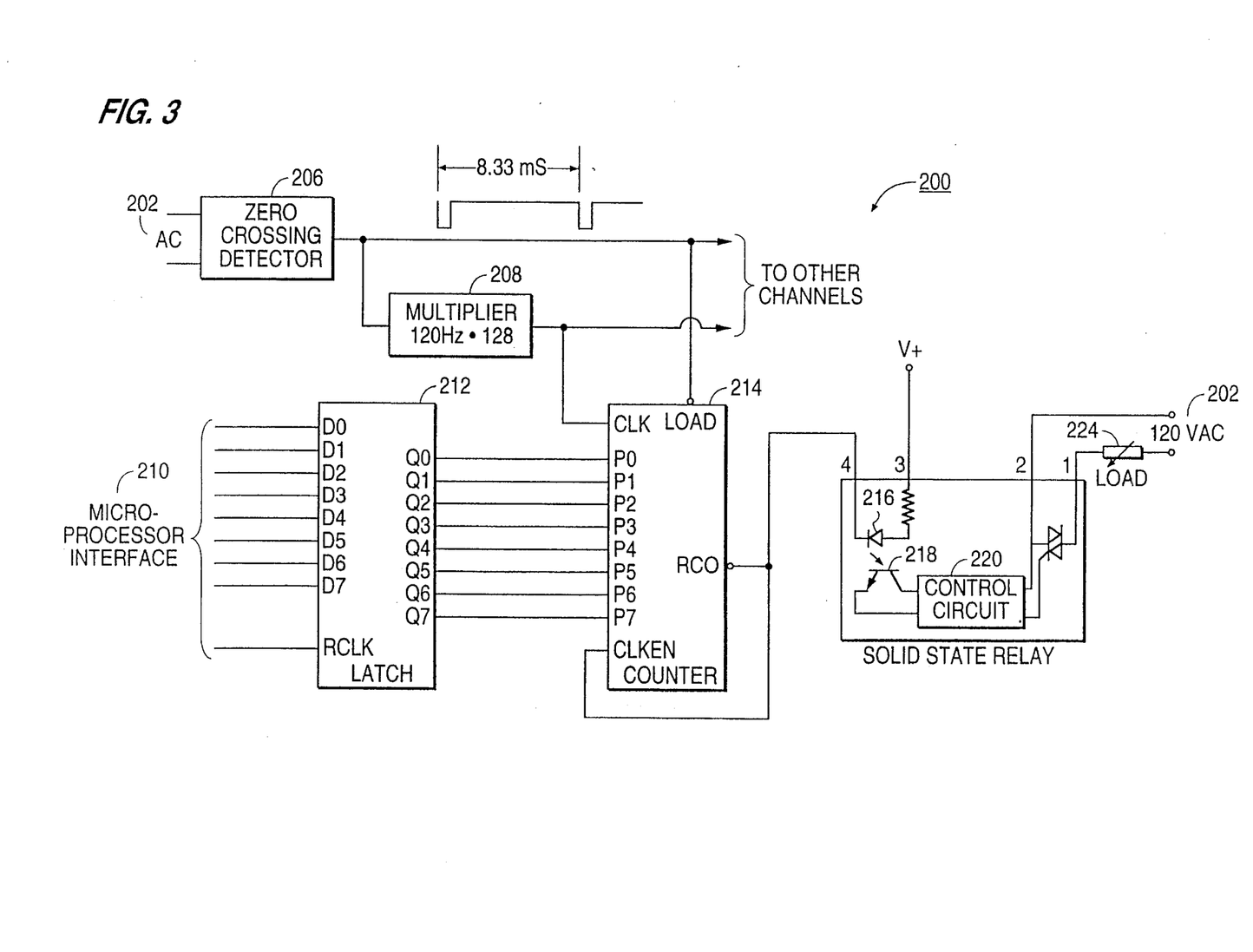
FIG. 3 is a representation of a single channel control circuit according to the invention.

FIG. 3 is a more detailed representation of a circuit arrangement 200 by which a single channel regulates the power supplied to a load 224 (the monitor circuits mentioned above have been omitted). Other channels with corresponding structure are coupled to this arrangement as indicated.

As illustrated, a standard AC supply 202 is coupled with a zero crossing detector circuit 206. This circuit 206 samples the AC line in order to determine when the AC supply goes through a zero point. Each time the zero point is crossed, a pulse is generated. Because the standard supply is 60 Hz, a pulse is generated approximately every 8.33 mS. This pulse is directly input to a counter 214 at its LOAD input. Further, the pulse is coupled to a multiplier circuit 208 which is used to generate a frequency that provides the clock input to the counter 214. In the example shown, a multiplier 208 is used to generate a frequency which is equivalent to the standard AC cycle multiplied by one hundred twenty-eight. Thus, the multiplier 208 provides a clock signal to the counter which pulses approximately every 33 microseconds. This relatively high frequency provides a smoother control input.

The signals from the zero cross detector circuits and multiplier circuits are applied respectively to the LOAD and CLK inputs of the counter 214. The counter 214 is coupled at eight input terminals P0 to P7 to eight data lines which provide logic signals from eight terminals Q0 to Q7 of a latch. The latch receives eight bit data signals at inputs D0 to D7 from a microprocessor interface 210. The control value is provided to a solid state relay 222 via a ripple carry out terminal (RCO) on the counter 214. This output drives an LED 216 which is coupled to a phototransistor 218 which in turn is coupled to a control circuit 220. The control circuit 220 regulates the power supplied to the load from the 120 VAC supply. In this way the low voltage control circuit is optically isolated from the high voltage power supply controlled by the solid state relay. Moreover, because the input signal to the relay is obtained from the zero-cross detector 206, spikes and noise are prevented from being impressed on the power signal by the relay 222.

Figure 4:
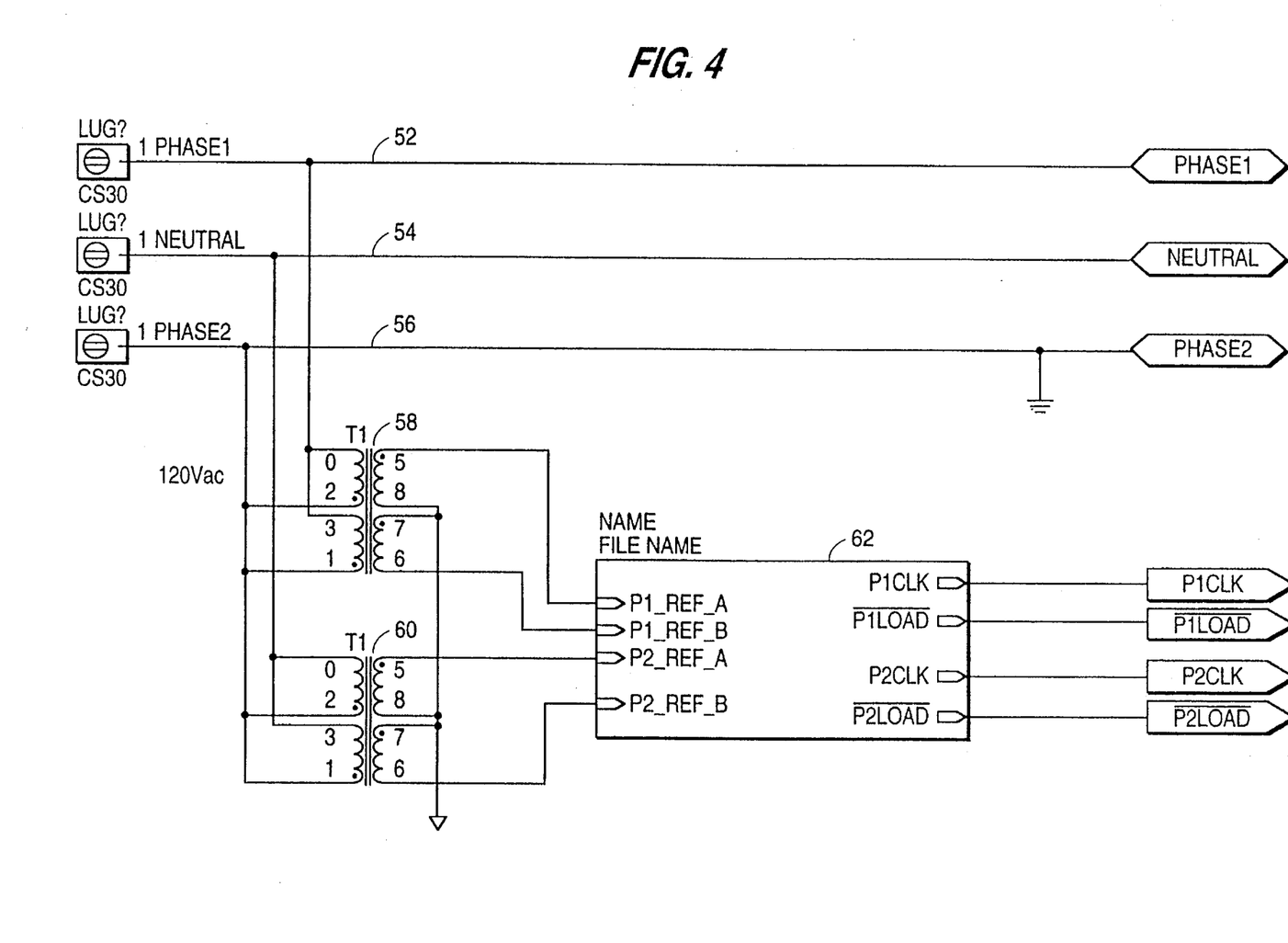
FIG. 4 is a circuit-diagram of a power supply/power logic circuit.

FIG. 4 shows a circuit through which low voltage power and logic signals may be obtained from a standard two phase AC line. While not shown, it is preferable to couple a heat sink to this device in order to dissipate heat, according to a technique known in the art. Three power lines provide the two phase AC power to the system. A phase 1 line 52 and a neutral line 56 form a circuit through a first step-down transformer 58. A second step-down transformer 60 is coupled to the neutral line 56 and a phase 2 line 54. Each transformer has two sets of coils so that a total of four low voltage AC signals, P1-REF-A, P1-REF-B, P2-REF-A and P2-REF-B are obtained, each of which are synchronized with the two phase standard AC supply.

Each pair of low-voltage references may then be input to zero cross detector circuits and multiplier circuits as shown in FIGS. 2 and 3. These circuits are embodied by circuit 62 which is essentially a phase-locked loop circuit. Such a circuit is commercially available, for example, in a preferred embodiment, Part No. MC1404613 manufactured by Motorola was used. This circuit outputs two sets of logic signals, a P1CLK signal and a P1LOAD signal, and a P2CLK signal and a P2LOAD signal. Each of these signals are then input to counters in order to control the switching of relay drivers as explained above.

Figure 5:
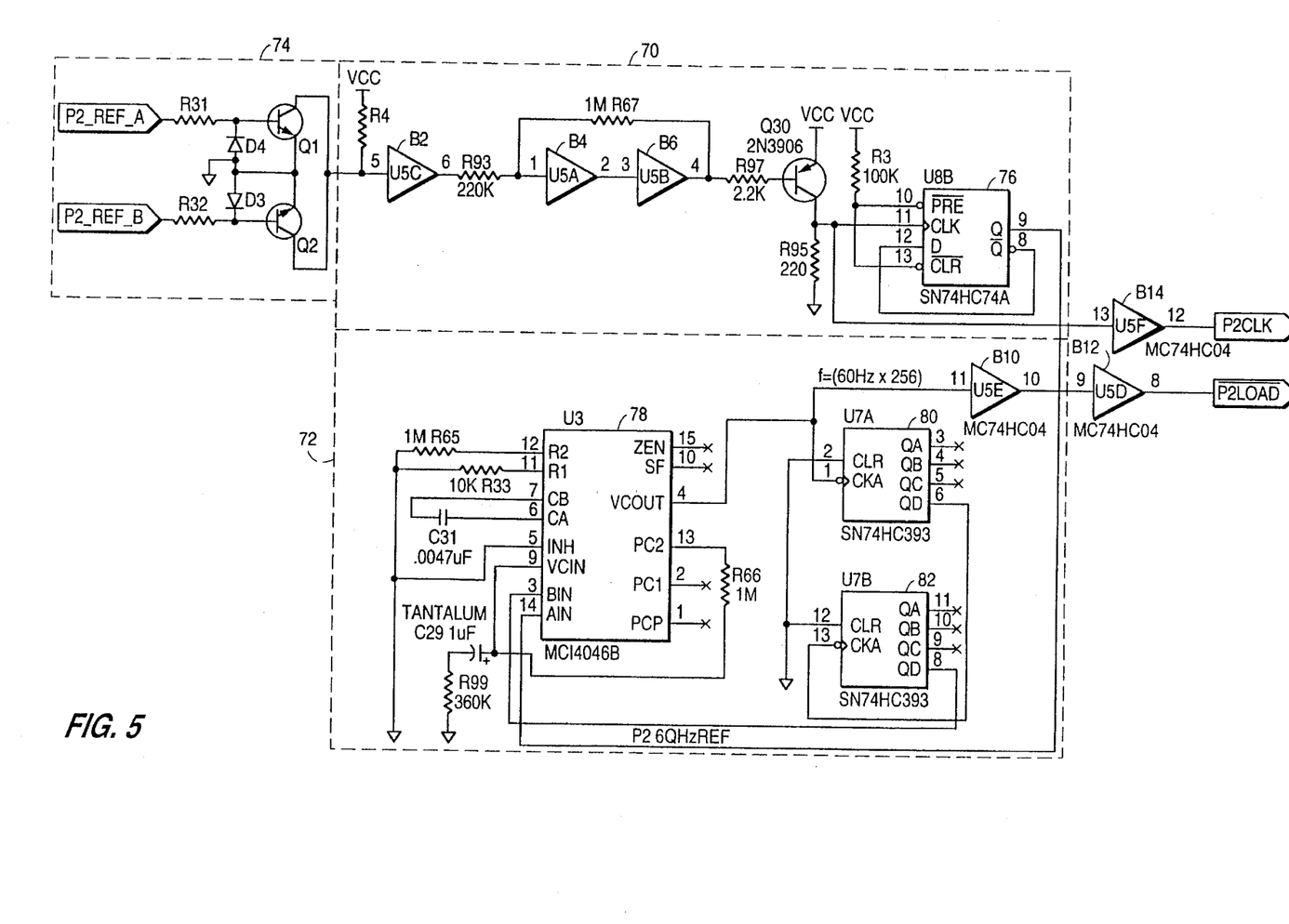
FIG. 5 is a circuit diagram showing examples of zero cross detector and multiplier circuits.

FIG. 5 shows in detail a portion of the phase-locked loop circuit which is comprised of zero cross detector and multiplier, as represented in FIGS. 2 and 3. While only the first phase signals (P1) are shown, corresponding elements are use for the second phase signals (P2). As shown, the two low voltage analog AC signals P1-REF-A and P1-REF-B are each input to a differential amplifier circuit comprised of resistors $R_{34}$ and $R_{35}$, diodes $D_5$ and $D_6$ and transistors $Q_3$ and $Q_4$, arranged as shown. These components provide a zero-crossing detect circuit 74.

The output of this circuit 74 is supplied to a circuit 70 comprised of cross inverters U3-C, U3-A, U3-B, a transistor $Q_{30}$, and associated resistors $R_4$, $R_5$, $R_{67}$, $R_{93}$, $R_{95}$, and $R_{97}$, a transistor $Q_{30}$, buffers $B_4$, $B_6$, $B_8$. These elements form a Schmitt trigger which is used to sharpen the edges (rise and fall time) of the signal coming from the zero crossing detect circuit 74 in order to drive the remaining elements shown.

The output of circuit 74 is provided to a flip-flop 76. The flip-flop 76 outputs a 60 Hz digital reference signal to a multiplier circuit 72 which includes a phase detector circuit 78. This circuit samples the 60 Hz signal and outputs a multiple of the 60 Hz signal as discussed above. Specifically, the 60 Hz signal is multiplied by 256. In addition to the phase detector circuit 78, the multiplier 72 includes associated resistors $R_{33}$, $R_{65}$, $R_{66}$, and $R_{99}$, capacitors $C_{29}$ and $C_{31}$, two counters 80, 82 and an inverter US-E arranged as shown. Signals are output from multiplier 72 and the zero cross detector 70 respectively via inverters US-D and US-F.

Figure 6A:
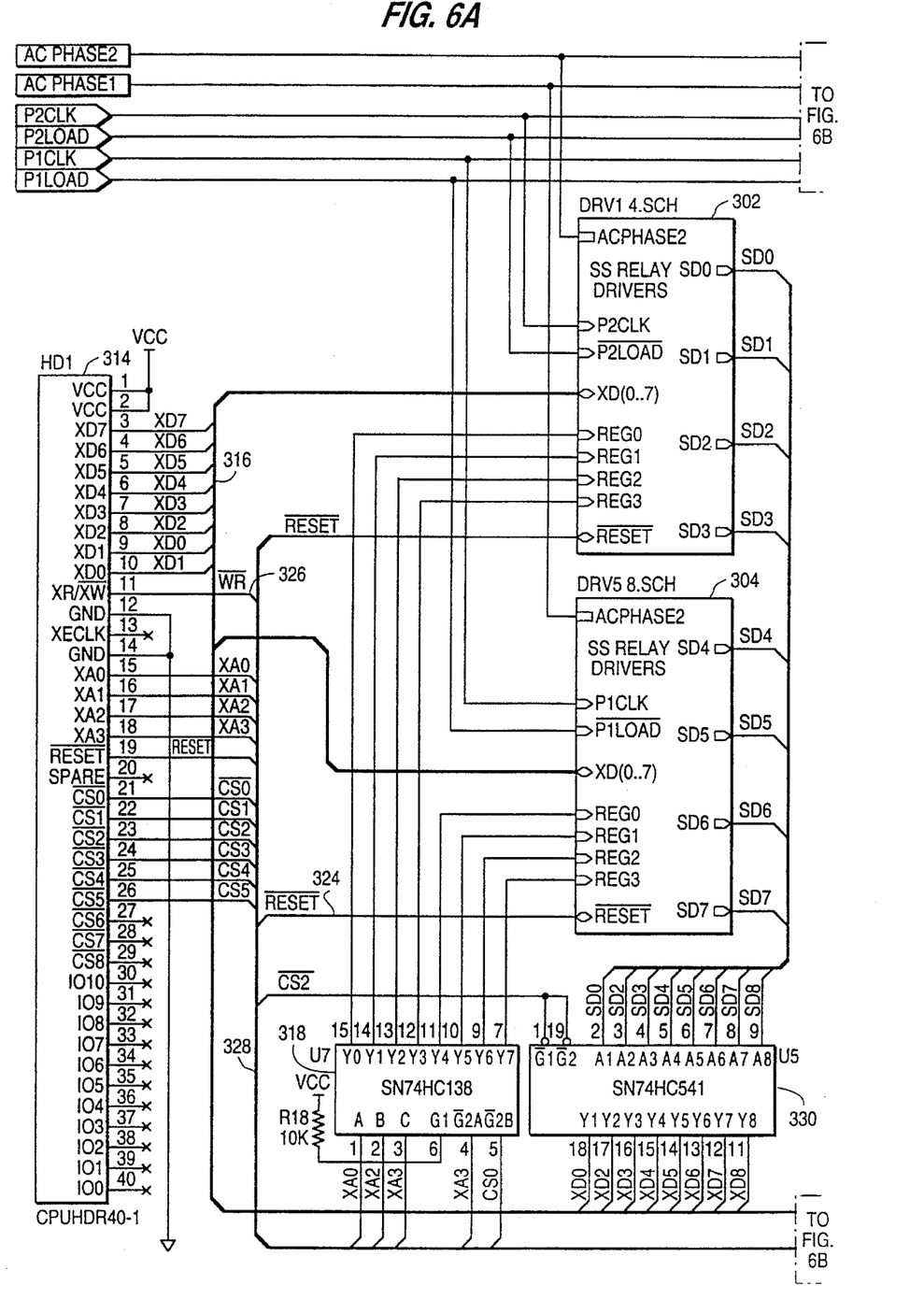
FIGS. 6A, 6B and 6C is a more detailed representation of the embodiment shown in FIG. 2.
Figure 6B:
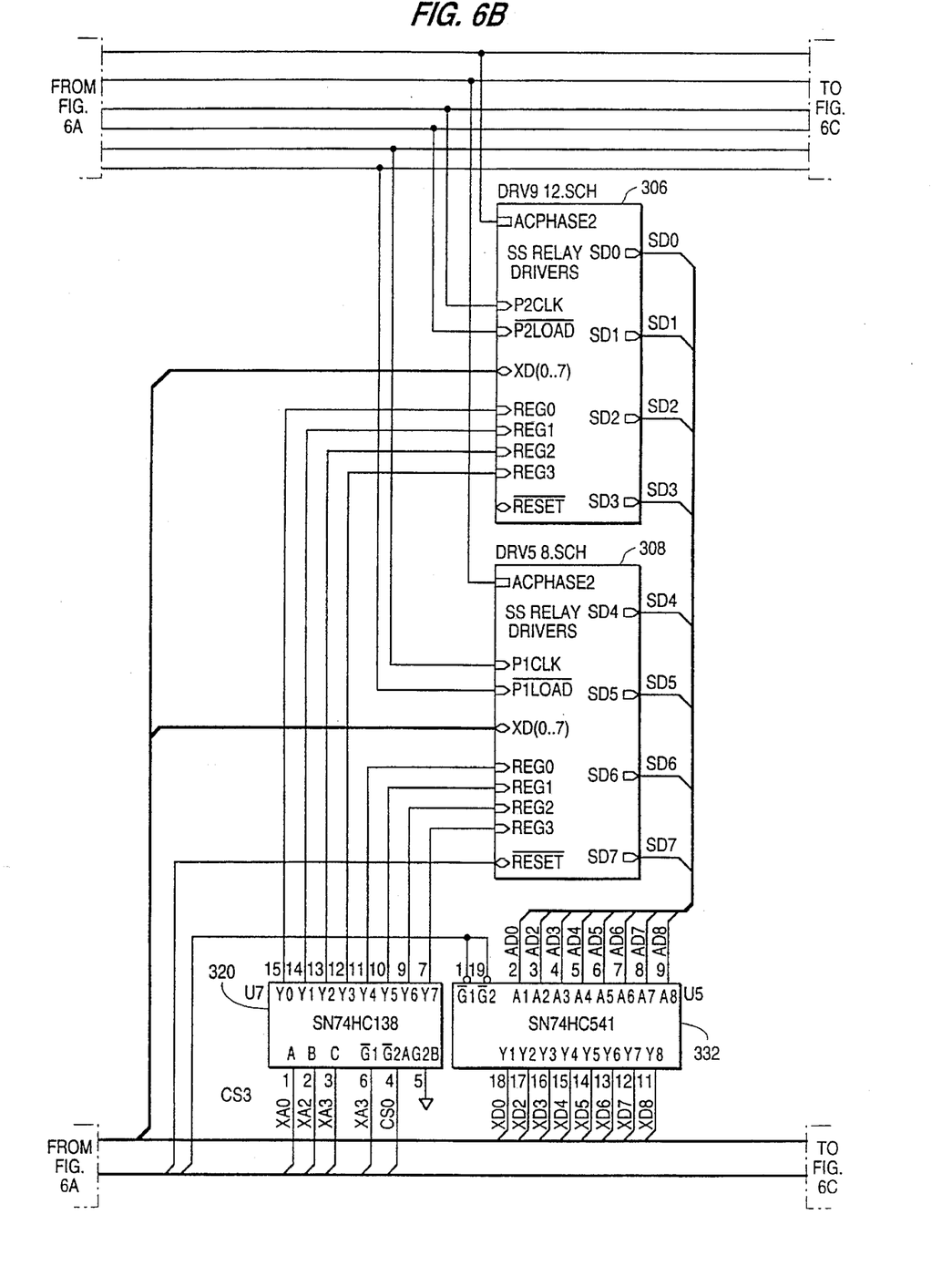
Figure 6C:
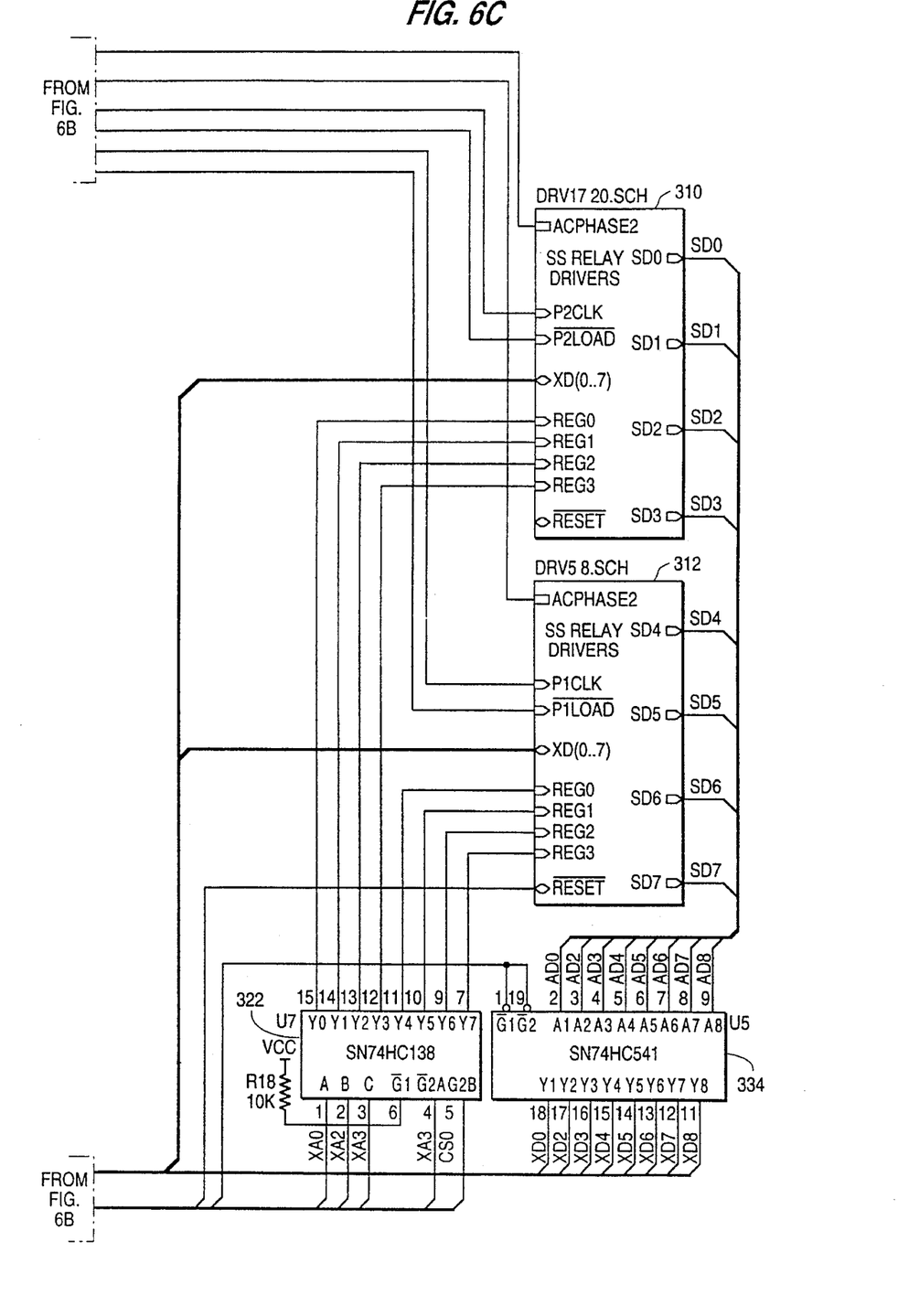

FIGS. 6A, 6B and 6C provides a detailed multiple-channel embodiment of the single channel arrangement shown in FIG. 2. For simplicity, not all the channels of the AC power module have been shown, only a sufficient number in order to facilitate understanding of the invention. It should be understood that additional circuits corresponding to those shown are added to provide control of more loads.

As shown, blocks 302, 304, 306, 308, 310, 312 representing the relay drivers discussed with reference to FIGS. 2 and 3 are coupled to either of the high voltage standard AC power supplies which are labelled Phase 1 or Phase 2, as above. These relay drivers utilize optical coupling, and are capable of safely controlling loads of up to 500 W. Of course, relays with higher power ratings may be substituted.

The relay drivers represented by blocks 302, 304, 306, 308, 310, and 312 provide switching of either the first phase power line Phase 1 or the second phase power line Phase 2. Accordingly, they are coupled either to P1CLK and P1LOAD or P2CLK and P2LOAD signals so that unwanted spikes and noise are eliminated. The clock signals read in eight bit data values from the interface circuit 314 in the manner set forth above in reference to FIG. 3. More specifically, each of the relay drivers represented by blocks 302, 304, 306, 308, 310, and 312 include register and latch circuits which are coupled to a data bus 316 that supplies eight data bits XD0 to XD7 from the microprocessor interface 314. The individual relay drivers are selected through address decode 318, 320, and 322 circuits which decode four bit address signals XA0 to XA3. A reset line 324 is further provided to reset each of the circuits to a preset initial state at power up. Further a write line 326 is provided to indicate a write condition with signal WR. Finally, each of the devices are coupled to select lines via address bus 328 which provide six select bits C30 to C35.

This arrangement permits the microprocessor to set the power level to each of the devices controlled by the relay drivers. Thus, the microprocessor can be programmed, for example to switch lights on or off or to dim lights at different times, or to turn on a coffee pot in the morning. Alternatively, the system can be programmed to initiate a vacation mode in which lights are turned on at night to protect the home and to turn off normally-used appliances to conserve energy. Further, the system can be programmed to keep track of the current power level of each load so that the channels may be reset to the same levels, for example, if power is temporarily interrupted.

Monitoring of the condition of the loads coupled to each relay driver is accomplished by the eight bit sense signals SD0 to SD7. This signal is input to the interface circuit through buffer circuits 330, 332, and 334 which are coupled to the data bus 316. In this way, the system is able to monitor the condition of a load and provide an indication of this condition to the microprocessor. Thus, it can be determined whether any given load is operating as instructed by the host microprocessor. If an error is detected by the host computer, it can then provide an indication of the error so that remedial measures may be taken.

Figure 7A:
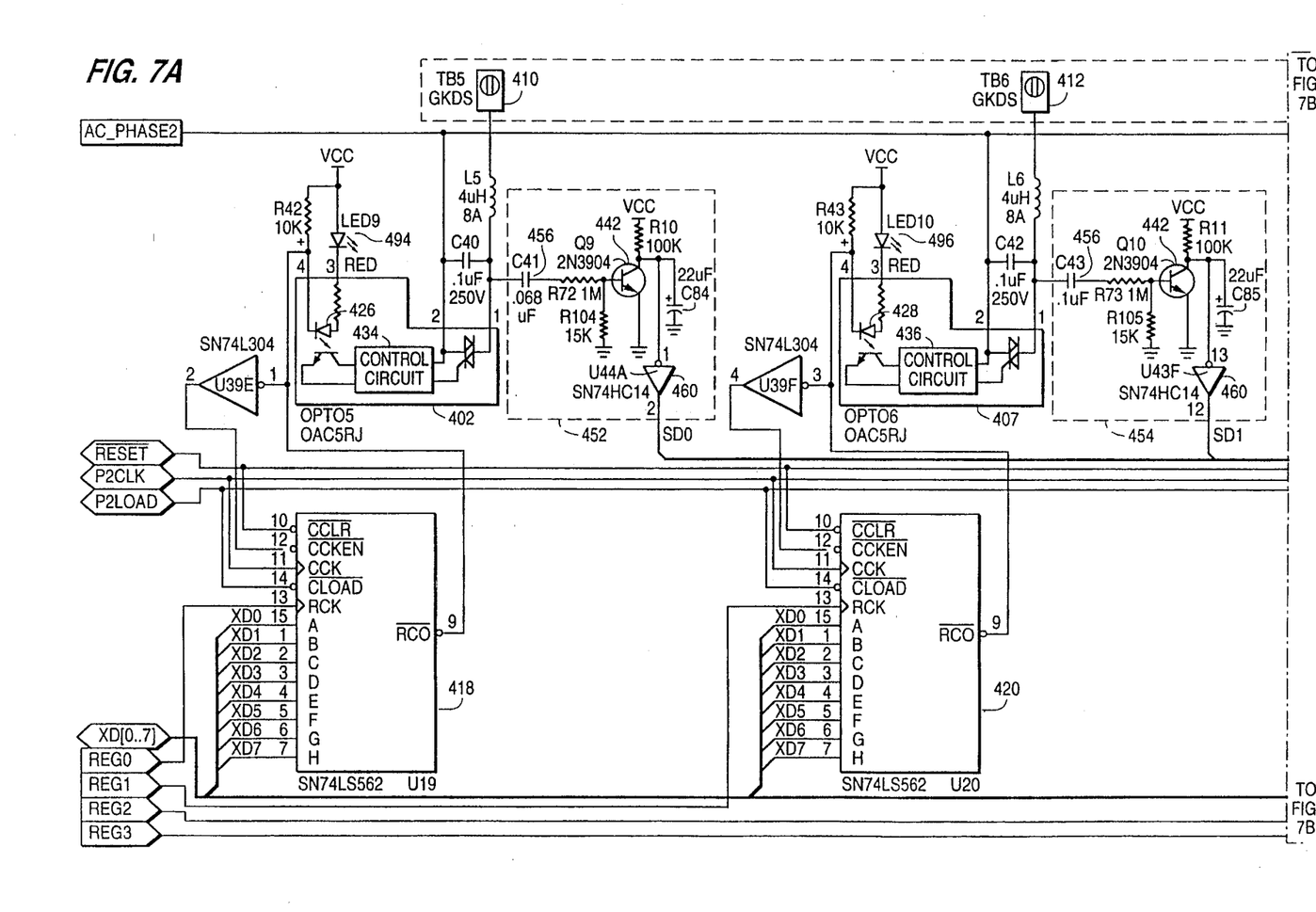
FIGS. 7A and 7B is a detailed representation of another embodiment of the invention.
Figure 7B:
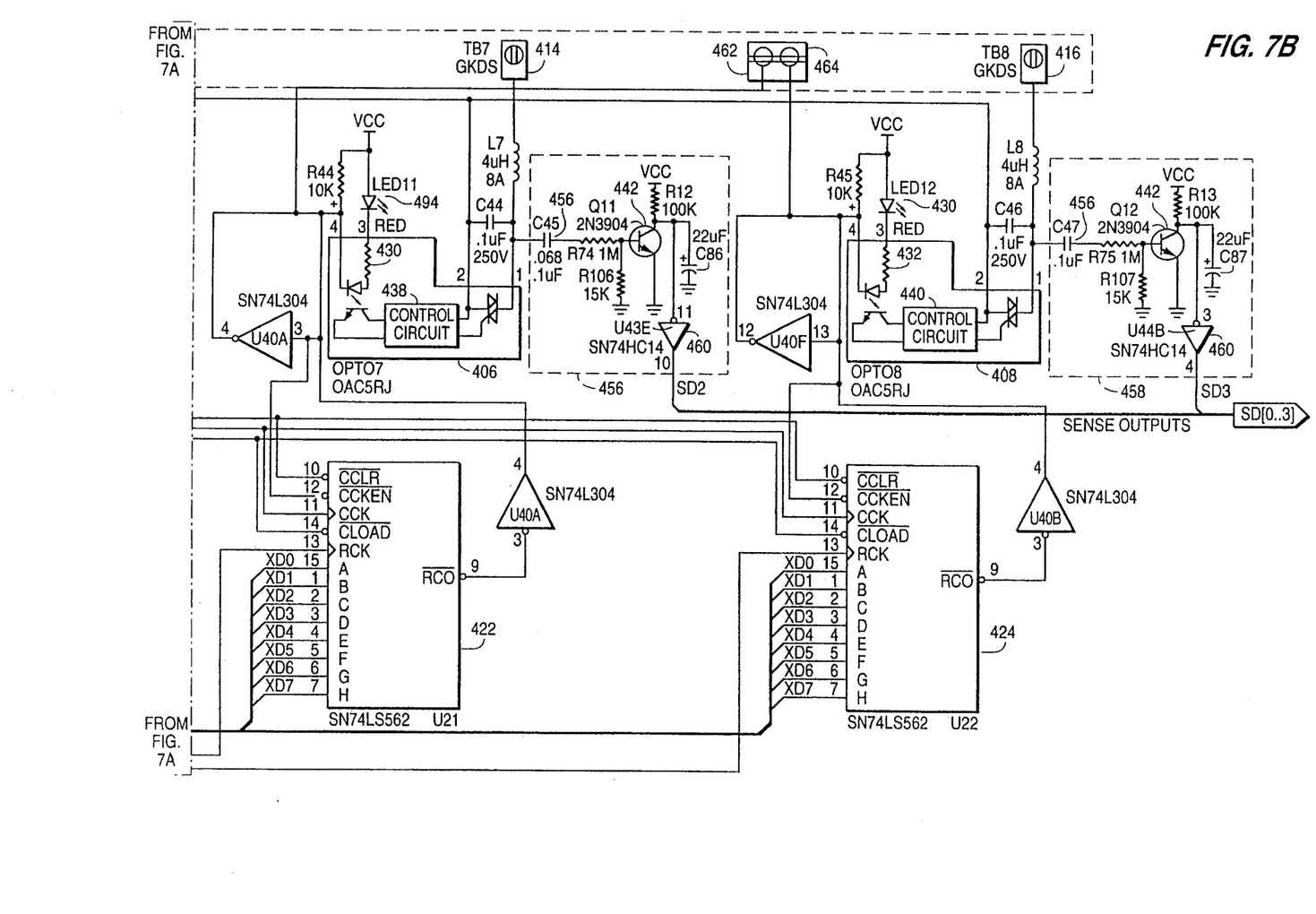

A more detailed example of the monitor circuitry according to a preferred embodiment is shown in FIGS. 7A and 7B. As in FIGS. 6A, 6B and 6C, while only four channel are shown for convenience, corresponding structure is added to provide additional channels. As illustrated, four solid state relays 402, 404, 406, and 408 control the power supply from the Phase 1 line to four screw terminals 410, 412, 414, and 416. Additional relays having corresponding arrangements may be utilized to provide the N channels discussed with reference to FIG. 2. Control signals are provided from counters 418, 420, 422, and 424 in the manner discussed in detail above in reference to FIG. 3. As explained above, these signals drive LEDs 426, 428, 430, and 432 which in turn provide optical control signals to control circuits 434, 436, 438, and 440 which regulate the power supplied to each load from the screw terminals. The line running between each relay and each screw terminal is monitored by monitoring circuits 452, 454, 456, and 458 each comprised of a grounded emitter transistor 442 which is passively coupled to the power supply line through two resistors 452, 454 and a capacitor 456.

When a current passes through the power line, the capacitor 456 is charged and thus provides a signal through the transistor 442. A Schmitt trigger 460 eliminates any slow rise time in this signal, and provides an indication to the microprocessor through a buffer circuit (as shown in FIGS. 6A, 6B and 6C) in the manner discussed above. Additionally, LEDs, such as LEDs 444, 446, 448, and 450 may be incorporated as shown in order to provide visual indications of whether the relays are currently active.

This embodiment more particularly shows an example of a circuit arrangement by which back-up or override switching may be provided for load devices or by which loads with higher power ratings can be controlled by the system. Specifically, two screw terminals 462 and 464 arranged together are each coupled to one of the plurality of counters connected with the microprocessor, as discussed above. Further, each of the two terminals is coupled to the optical control circuit which controls the solid state relays. Through this arrangement, back-up switching devices may be connected through the double screw-terminals 462 and 464 to provide switching control of the relays. These additional inputs can then be used to provide control signals to the relays in the event there is a system failure.

In addition to this feature, the double screw terminals 462 and 464 may be used to provide control signals from the system through the respective counters. This function may be accomplished by connecting lines from the double screw terminals to solid state relays which have higher power ratings. In this way, the system can be used to control devices such as swimming pool heaters or water heaters which have a higher power rating than other household appliances such as audio equipment, lights, or the like.

Accordingly, the AC power module of the present invention may conveniently and reliably control several loads from a central location. As required by the particular environment in which it is used, the module may also control an external relay, for example one which is rated for higher power devices or can be coupled to back-up switching devices so that load devices can be operated in a conventional manner in the event of a system failure.

In order to facilitate installation and servicing, the electrical components described above can be constructed in a compact arrangement. According to another embodiment of the invention, the above-described components may be arranged on a single printed circuit board (PCB) which may be installed in a standard electrical box. In this way, the module can be constructed in a compact manner on one board, and can distribute power in an efficient manner. That is, the module may be physically arranged so as to provide the same, efficient scheme as a conventional circuit box, for example, with a half-hot arrangement.

According to this preferred embodiment, the PCB is attached to a Trilliant electrical box (manufactured by Square D Company). This electrical box includes various slots through which power supply cables, a serial cable from the microprocessor, and power lines to the loads may be attached. Standard breakers and fuses may further be coupled to each of the lines to protect the components on the board and the loads attached thereto.

Figure 8A:
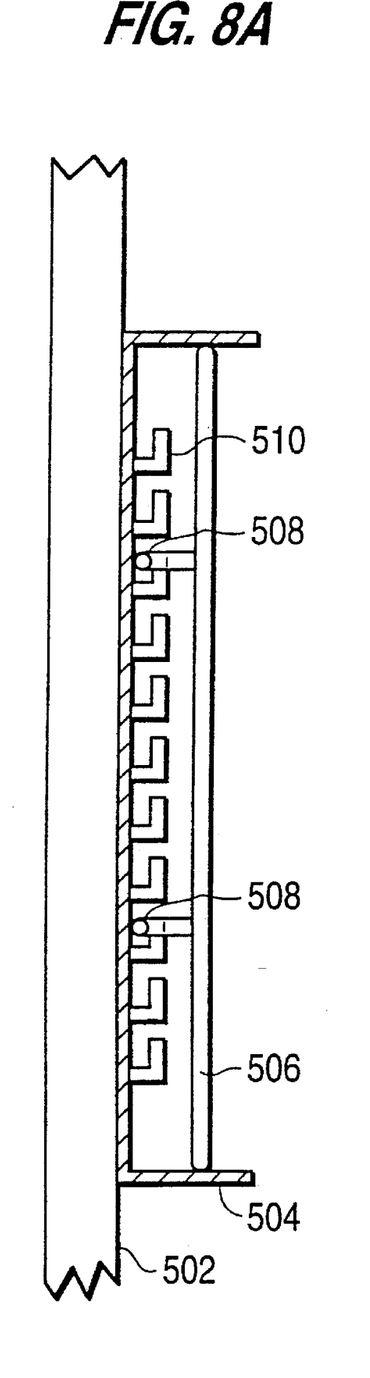
FIGS. 8A, 8B, and 8C are diagrams of an installation scheme according to an embodiment of the invention.
Figure 8B:
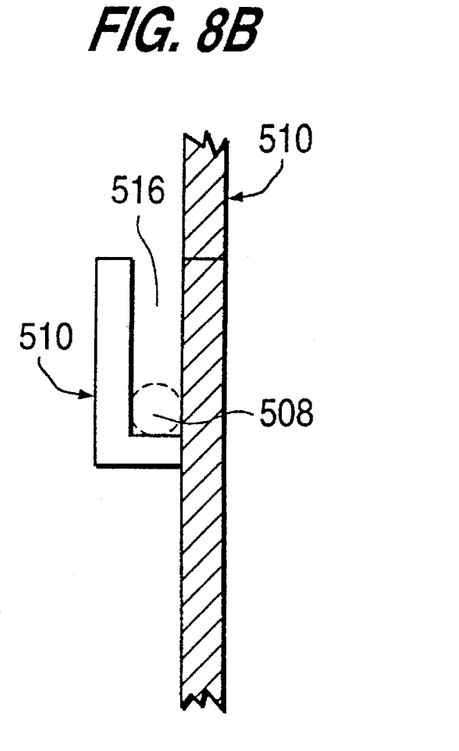
Figure 8C:
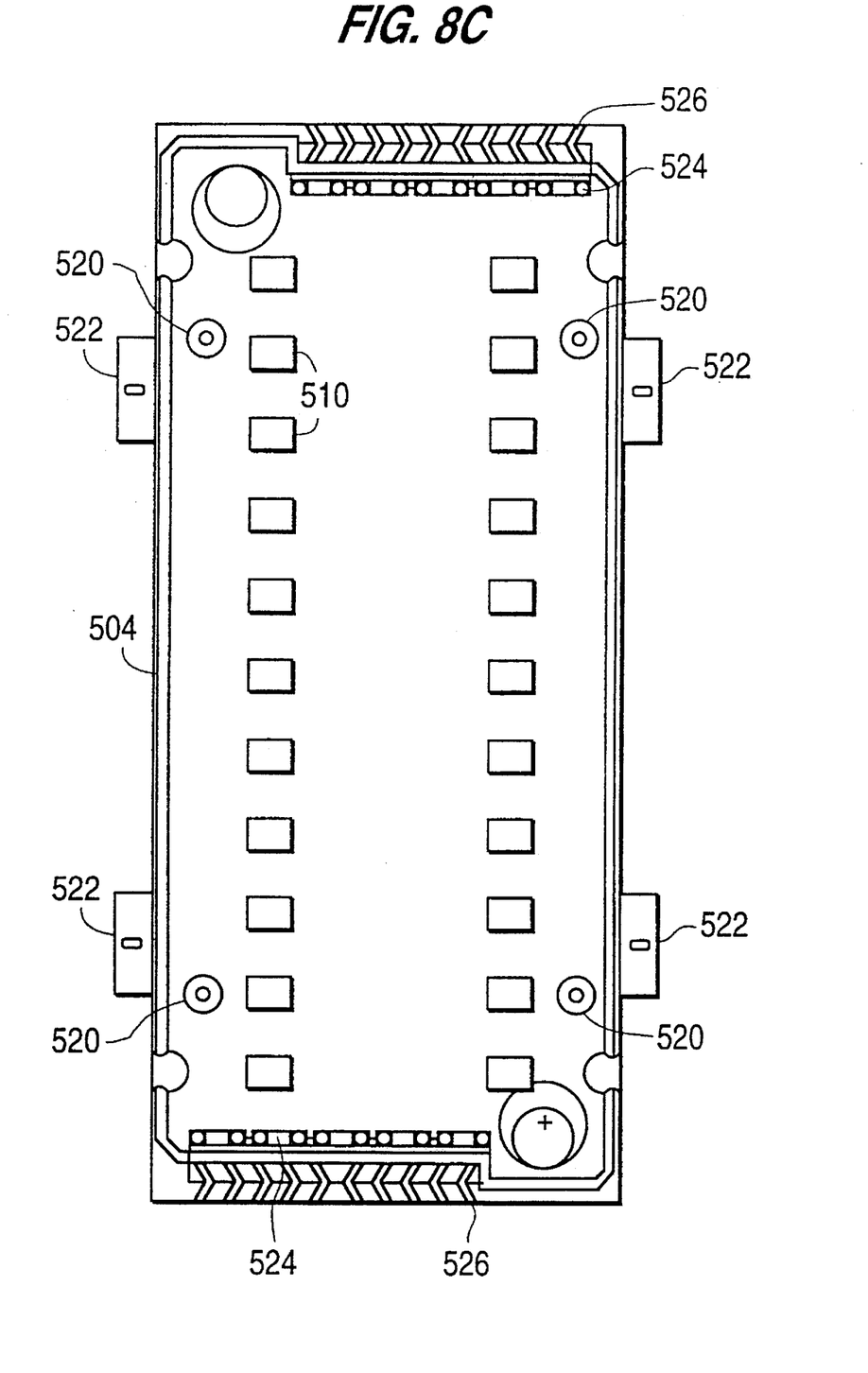

FIGS. 8A to 8C illustrate one such modular arrangement in which the AC power module is placed in an electrical box which may be installed in a wall of a home or business. FIG. 8A is a cross-sectional side perspective in which an electrical box 504 is attached to a wall 502. The electrical box includes several L-shaped tabs 510 which protrude out from the floor of the box. As shown in FIG. 8B, the L-shaped tabs 510 each form a space 516 into which a pin 508 that is fixedly attached to the PCB 506 is inserted. According to the preferred embodiment, the PCB has four such pins, attached thereto. Thus, the entire AC module may be simply snapped into place by lowering the assembly into the electrical box until the pins interlock with the mating tabs 508.

FIG. 8C shows a plan view of the bottom of electrical box 504 which is mountable to a wall through slots 522. Each end of the box includes a set of wiregator slots 526 and a set of cable clamps 524 through which the various lines may be inserted and held in place. The box 504 includes several L-shaped tabs 510 arranged in two rows, as well as four holes 520. Several tabs 510 are provided so that not only can the AC power module be attached to the box 504 as described above, other modular components of the system can be installed in a similar manner.

This arrangement permits more convenient installation and removal of the AC power module than in a conventional circuit board. That is, the unique clamping arrangement comprised of the L-shaped tabs and the locking pins allows the AC power module to simply be removed and replaced in the event of a failure of the device. Together with the monitoring functions described above, the modular structure advantageously permits rapid detection and repair of any faults in the power module.

Furthermore, the clamping arrangement can be extended to other components of the automation system. Thus, while some elements of the system such as the electrical box are intended to be permanently installed, the various modular components of the system can be interchanged in such locations. Even if not used interchangeably with other modules once installed, the ability of several different components to be placed into one fixed component, such as the electrical box, increases uniformity and thereby reduces manufacturing costs.

The foregoing is a detailed description of the preferred embodiments. The scope of the invention, however, is not so limited. Various alternatives will be readily apparent to one of ordinary skill in the art. The invention is only limited by the claims appended hereto.

What is claimed:

1. An AC power module for setting the level of power supplied to a plurality of electrical devices according to control signals from a microprocessor comprising:

at least one solid state relay coupling one of said plurality of devices to a high voltage AC power supply;

means for providing a low voltage reference signal having a phase synchronized with said high voltage AC power supply;

means for adjusting said low voltage signal in accordance with said control signals to provide a relay signal for controlling said solid state relay device, said relay signal determining the level of power supplied to said one of said plurality of devices; and means for monitoring power supplied to said one of said plurality of devices, said monitoring means providing a digital signal to said microprocessor which indicates whether current is flowing through said one of said plurality of devices;

wherein said means for adjusting includes a counter which reads in said control signals from said microprocessor according to a clock pulse supplied by a multiplier circuit, said clock pulse having a frequency which is a multiple of the frequency of said high voltage AC power supply.

2. The AC power module of claim 1 wherein said AC power module is one of a plurality of nodes which are operated by said microprocessor through a host interface.

3. The AC power module of claim 1 wherein said power monitoring means includes a grounded emitter transistor coupled to a Schmitt trigger.

4. The AC power module of claim 1 wherein said means for providing a low voltage reference signal is optically isolated from said at least one relay.

5. The AC power module of claim 1 wherein said clock pulse has a frequency which is 256 times the frequency of said low voltage reference signal.

6. The AC power module of claim 1 further comprising means for providing a second relay signal for controlling said solid state relay device from a switching control device that is external to said AC power module, said relay signal determining the level of power supplied to said one of said plurality of devices, whereby back-up switching is available for controlling said relay device.

7. The AC power module of claim 1 further including means for providing said relay signal to a relay that is external to said AC power module.

8. The AC power module of claim 1 wherein said AC power module is constructed on a printed circuit board (PCB) which is detachably mounted in an electrical box, said PCB having a plurality of pins which are matably connectable to a corresponding plurality of L-shaped tabs attached to said electrical box.

9. The AC power module of claim 2 wherein said plurality of nodes are located remotely from said a host computer controlled by said microprocessor.

* * * * *